United States Patent [19]

Taek

[11] Patent Number: 4,926,097
[45] Date of Patent: May 15, 1990

[54] BALLAST CIRCUIT FOR A FLUOROESCENT LAMP

[75] Inventor: Kim C. Taek, Plymouth, Mich.
[73] Assignee: Saturn International, Inc., Plymouth, Mich.
[21] Appl. No.: 173,108
[22] Filed: Mar. 28, 1988
[51] Int. Cl.$^5$ ............................................. H05B 41/36
[52] U.S. Cl. ..................................... 315/307; 315/119; 315/219; 315/DIG. 2; 315/DIG. 4; 315/DIG. 5
[58] Field of Search ............... 315/119, 127, 194, 199, 315/209 R, 219, 220, 225, 277, 307, DIG. 2, DIG. 4, DIG. 5

[56] References Cited

U.S. PATENT DOCUMENTS 4,488,090 12/1984 Hancock ........................ 315/277 X
4,698,554 10/1987 Stupp et al. ......................... 315/307
4,700,113 10/1987 Stupp et al. ............... 315/DIG. 2 X
4,754,199 6/1988 Parker ............................. 315/256 X Primary Examiner—David Mis
Attorney, Agent, or Firm—Gifford, Groh, Sprinkle, Patmore and Anderson

[57] ABSTRACT

A ballast circuit for a fluorescent light bulb of the type having an elongated envelope with an electrode at each end. The ballast circuit includes a square wave generator which generates a square wave in excess of 10,000 hertz. The output from the square wave generator is used to modulate a voltage from a power source having a voltage in the range of 400–800 volts so that the modulated voltage has a frequency equal to the square wave frequency. The resulting modulated voltage is then electrically connected to the electrodes of the fluorescent lamp which illuminates the lamp.

11 Claims, 1 Drawing Sheet

BALLAST CIRCUIT FOR A FLUOROESCENT LAMP

BACKGROUND OF THE INVENTION

I. Field of the Invention

The present invention relates generally to a ballast circuit for a fluorescent lamp.

II. Description of the Prior Art

Fluorescent lamps typically comprise an elongated tube having an electroluminescent coating on its interior surface. An electrode is provided at each end of the tube and the electrodes are electrically connected to an alternating current power source. This alternating current causes the electrons to impinge upon the interior electroluminous coating of the lamp thus illuminating it.

In the previously known fluorescent lamp assemblies, a ballast assembly provides alternating current to the electrodes on the fluorescent lamp in order to illuminate the lamp. Typically, the ballast assembly comprises a transformer which increases the voltage from line voltage of 110-220 volts to approximately 600-800 volts. In addition, the current which flows through the lamp typically averages around 800 milliamps.

A primary disadvantage of these previously known ballast assemblies for fluorescent lamps is that a higher voltage is required for the fluorescent lamp when the fluorescent lamp is used outside in a cold environment. For example, the ballast circuit for exterior lamps in cold environments typically produces a voltage of 800 volts AC to the fluorescent lamp, while a ballast circuit for interior fluorescent lamps only produces about 600 volts AC to the lamp. Thus, two different ballast circuits are required depending upon whether the fluorescent lamp is used outside or inside.

A still further disadvantage of these previously known ballast circuits is that they provided 50 or 60 cycles per second alternating current to the fluorescent lamp electrodes. As such, they were relatively energy inefficient Such fluorescent lamps are also prone to flickering due to the relatively low frequency alternating current used to power them.

A still further disadvantage of these previously known ballast assemblies is that they are unable to variably dim the fluorescent lamp. Instead, the lamp is either fully on or fully off.

SUMMARY OF THE PRESENT INVENTION

The present invention provides a ballast circuit for a fluorescent lamp which overcomes all the above-mentioned disadvantages of the previously known devices.

In brief, the ballast circuit of the present invention comprises means for generating a high frequency square wave in excess of 10,000 hertz and, preferably, substantially 100,000 hertz. Any conventional means, such as flip-flop digital circuits, can be employed to generate the square wave.

The square wave is, in turn, used to modulate an power source having a voltage in the range of 400-800 volts. This modulation of electrical power from the power source entails switching the direction of current flow through the lamp at a frequency equal to the square wave frequency.

The modulated electrical power is then electrically connected to the electrodes at opposite ends of the fluorescent lamp. Consequently, a high frequency alternating current is electrically connected to the fluorescent lamp electrodes and illuminates the fluorescent lamp by impingement of the electrons against the electroluminescent coating on the interior of the lamp. However, due to the high frequency of the alternating current, only a low current, for example 400 milliamps, passes through the lamp, thereby conserving energy.

The ballast circuit of the present invention also provides for a dimmer control in order to control the degree of the illumination of the lamp. In the preferred form of the invention, a dimmer control varies the frequency of modulation of the alternating current from 0-60 kilohertz. At the lower frequencies, the fluorescent lamp is dimmed while, conversely, the illumination of the fluorescent lamp increases with the frequency of modulation of the alternating current.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED

Embodiment of the Present Invention

Figures 1, 2, 3:
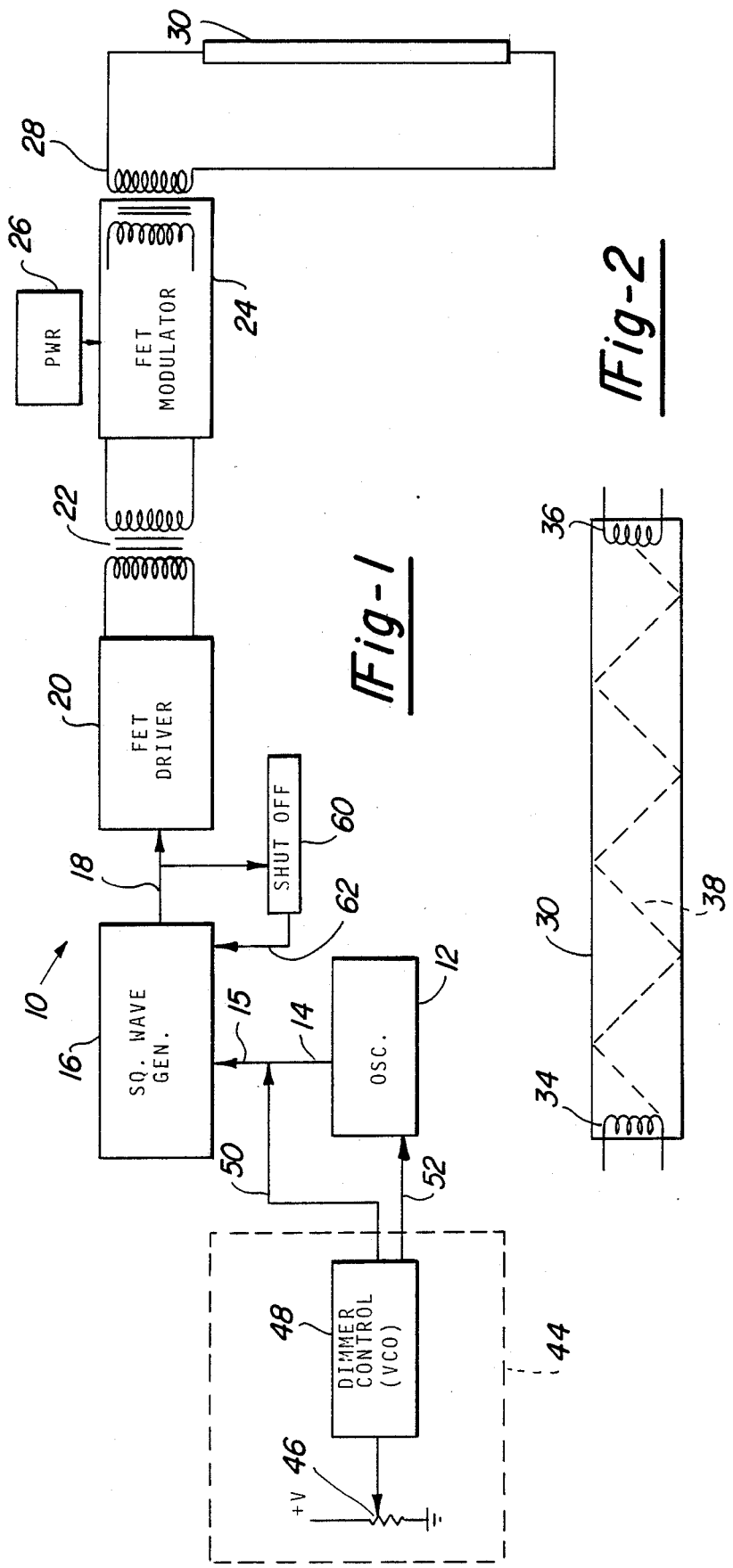
FIG. 1 is a block diagrammatic view illustrating a preferred embodiment of the ballast circuit of the present invention.
FIG. 2 is a diagrammatic view illustrating the illumination of the fluorescent lamp.
FIG. 3 is a view similar to FIG. 2 illustrating a brighter illumination of the fluorescent lamp.

With reference to FIG. 1, a block diagrammatic view of the ballast circuit 10 of the present invention is there shown and comprises a fixed frequency oscillator 12 which produces a sinusoidal signal on its output 14. The oscillator 12 can be of any conventional construction, for example a ring of invertors and produces a frequency in excess of 10,000 hertz and preferably substantially 100,000 hertz.

The output from the oscillator 12 is connected to an input 15 of a square wave generator 16 which converts the sinusoidal signal on its input 15 to a square wave. The square wave from the square wave generator 16 is of the same frequency as the signal on input 15 and the square wave signal is provided as an output signal on an output 18 from the square wave generator 16.

Any conventional means can be used to construct the square wave generator 16. For example, the outputs from one or more flip-flops can be used as the output from the square wave generator 16 while the switching of the flip-flops is controlled by the signal on input 15 of the square wave generator 16.

The output 18 from the square wave generator 16 is connected as an input signal to a FET driver 20. The driver 20 amplifies the square wave signal from output 18 and provides the amplified signal through a transformer 22 to an FET modulator 24.

The FET modulator 24 uses the frequency of the input signal from the transformer 22 to modulate the electrical power from a power supply 26. The modulator 24 thus produces a high voltage and high frequency alternating current at its output.

Typically, the FET modulator 24 produces alternating current in the range of 400-600 volts and having a frequency in excess of 10,000 hertz and preferably in the range of 100,000 hertz. This high voltage and high frequency output is then electrically connected by a transformer 28 to the electrodes at opposite ends of a fluorescent lamp 30.

With reference now particularly to FIG. 3, the fluorescent lamp 30 is thereshown in greater detail as comprising an elongated tube 32 having an electrode 34 at one end and an electrode 36 at its opposite end. The interior of the tube 32 is covered with an electroluminescent coating. This coating produces light whenever an electron impinges upon it.

In operation, the high frequency alternating current causes the electrodes to impinge at numerous points along the tube 32, as illustrated diagrammatically by the line 38, thus illuminating the lamp. The number of impingements between the electrodes and the lamp coating 32, however, are much greater for the high frequency alternating current of the present invention than for the low frequency alternating current that has been used in the past. Consequently, the same amount of illumination of the lamp can be obtained at much lower currents than has been previously known thereby effecting energy savings.

Furthermore, the high frequency power which is supplied to the electrodes of the fluorescent lamp in accordance with the present invention cause the lamp to be instantly turned on once activated. This eliminates the previously known flickering of the fluorescent lamps and also eliminates the necessity of using two different ballast assemblies for interior and exterior lamps.

Referring again to FIG. 1, the ballast circuit 10 of the present invention can optionally include a dimmer circuit 44 for controlling the amount of illumination of the fluorescent lamp 30. The dimmer circuit 44 includes a rheostat 46 which, by user control, provides a variable frequency to a dimmer control 48. The dimmer control 48 includes a voltage control oscillator which produces a sinusoidal signal on its output 50. The frequency of this signal on output 50 varies from between 0-60 kilohertz.

The output 50 from the dimmer control 48 is also coupled as an input signal to the input 15 of the square wave generator 16. Additionally, the dimmer control 48 generates a signal on output line 52 to the oscillator 12 which disables the oscillator 12. Consequently, whenever the dimmer control 48 is in operation, it disables the fixed frequency oscillator 12 and, instead, replaces the output from the fixed frequency oscillator 12 by its own frequency.

Variation of the potentiometer 46 varies the modulation frequency of the FET modulator 24. This, in turn, causes the electrons to impinge a fewer number of times against the interior surface of the tube 32, illustrated diagrammatically in FIG. 2, at lower frequencies. A fewer number of impingements between the electrode and the interior of the fluorescent tube 32 as shown in FIG. 2 as contrasted against FIG. 3 results in a dimmer illumination of the fluorescent lamp 30.

Referring to FIG. 1, a shut off circuit 60 monitors the frequency of the square wave generator 16. Whenever the frequency exceeds a predetermined frequency, as might occur in the event of a lightening strike, the circuit generates an output signal on line 62 for a preset time period, e.g. ten seconds, and disables the square wave generator 16 for that preset time period. Thereafter, the generator 16 resets to its preset lower frequency.

From the foregoing, it can be seen that the ballast circuit of the present invention provides an improved ballast circuit which overcomes all the above-mentioned disadvantages of the previously known ballast circuits.

Having described my invention, however, many modifications thereto will become apparent to those skilled in the art to which it pertains without deviation from the spirit of the invention as defined by the scope of the appended claims.

I claim:

1. A ballast circuit for a fluorescent lamp, said lamp comprising an elongated envelope with an electrode at each end, said circuit comprising:

means for generating a high frequency square wave in excess of 10,000 Hertz, means for modulating an electrical power source having a voltage in the range of 400-800 volts by said square waver so that the modulated voltage has a frequency at which the voltage polarity inverts equal to said square wave frequency, means for electrically connecting said modulated voltage to the lamp electrodes, and means for dimming said lamp, wherein said dimming means comprises means for varying said square wave frequency, wherein said square wave generating means comprises a fixed frequency oscillator, and wherein said dimming means comprises a variable frequency oscillator responsive to an input signal, means for varying the input signal, and means responsive to an output from the variable frequency oscillator for disabling said fixed frequency oscillator.

2. The invention as defined in claim 1 wherein said square wave frequency is in the range of 10-150 kilohertz.

3. The invention as defined in claim 1 wherein said variable frequency oscillator is a frequency controlled oscillator.

4. The invention as defined in claim 3 wherein said means for varying the input signal comprises a rheostat.

5. The invention as defined in claim 1 and comprising means for measuring the frequency of the high frequency square wave generated by the square wave generator means and for generating an output signal when the frequency exceeds a predetermined frequency, and means responsive to said output signal for disabling said square wave generator means for a predetermined time period.

6. A ballast circuit for a flourescent lamp, said lamp comprising an elongated envelope with an electrode at each end, said circuit comprising:

means for generating a high frequency square wave in excess of 10,000 Hertz, means for modulating a voltage from electrical power source having a voltage in the range of 400-800 volts by said square wave so that the modulated voltage has a frequency at which the voltage polarity inverts equal to said square wave frequency, means for electrically connecting said modulated AC voltage to the lamp electrodes, means for measuring the frequency of the high frequency square wave generated by the square wave generator means and for generating an output signal when the frequency exceeds a predetermined frequency, and means responsive to said output signal for disabling said square wave generator means for a predetermined time period.

7. The invention as defined in claim 6 wherein said square wave frequency is in the range of 10–150 kilohertz.

8. The invention as defined in claim 6 and comprising means for dimming said lamp.

9. The invention as defined in claim 8 wherein said dimming means comprises means for varying said square wave frequency.

10. The invention as defined in claim 9 wherein said square wave generating means comprises a fixed frequency oscillator, and wherein said dimming means comprises a variable frequency oscillator responsive to an input signal, means for varying the input signal, and means responsive to an output from the variable frequency oscillator for disabling said fixed frequency oscillator, wherein said variable frequency oscillator is a frequency controlled oscillator.

11. The invention as defined in claim 10 wherein said means for varying the input signal comprises a rheostat.

* * * * *